United States Patent [19]
Nieckarz et al.

[11] Patent Number: 6,132,549
[45] Date of Patent: Oct. 17, 2000

[54] WOOD-PRODUCT LAMINATED COMPOSITES

[75] Inventors: Gregory F. Nieckarz; Fred E. Carlson, both of Eugene; William D. Detlefsen, Springfield, all of Oreg.

[73] Assignee: Borden Chemical, Inc., Columbus, Ohio

[21] Appl. No.: 09/155,256

[22] PCT Filed: Jan. 30, 1998

[86] PCT No.: PCT/US98/01830

§ 371 Date: Sep. 22, 1998

§ 102(e) Date: Sep. 22, 1998

[87] PCT Pub. No.: WO98/38229

PCT Pub. Date: Sep. 3, 1998

Related U.S. Application Data

[60] Provisional application No. 60/038,335, Feb. 27, 1997, and provisional application No. 60/040,009, Mar. 3, 1997.

[51] Int. Cl.$^7$ ........................................................ C09J 5/00
[52] U.S. Cl. .......................... 156/335; 524/384; 524/841; 528/155
[58] Field of Search .................................. 524/384, 841; 528/155; 156/335

[56] References Cited

U.S. PATENT DOCUMENTS

| | | | |
|---|---|---|---|
| 2,314,701 | 3/1943 | Harvey | 156/335 |
| 2,675,335 | 4/1954 | Rankin et al. | 154/43 |
| 2,699,417 | 1/1955 | Repsher et al. | 156/335 |
| 2,853,460 | 9/1958 | Archibald | 524/841 |
| 2,879,827 | 3/1959 | Bowditch | 528/155 |
| 3,216,884 | 11/1965 | Emmett | 161/232 |
| 3,448,001 | 6/1969 | Jarvi | 528/155 |
| 3,616,179 | 10/1971 | McCombs et al. | 156/335 |
| 3,988,386 | 10/1976 | Hesse et al. | 260/831 |
| 4,190,547 | 2/1980 | Mahnke et al. | 252/62 |
| 4,287,311 | 9/1981 | Taniguchi et al. | 525/58 |
| 4,514,462 | 4/1985 | Brooker | 428/285 |
| 4,758,478 | 7/1988 | Daisy et al. | 428/529 |
| 5,218,038 | 6/1993 | Johnson et al. | 524/541 |
| 5,371,140 | 12/1994 | Parks | 525/54.42 |
| 5,385,979 | 1/1995 | Ozawa et al. | 525/145 |
| 5,498,647 | 3/1996 | Shiau et al. | 524/14 |

FOREIGN PATENT DOCUMENTS

WO 92/18557 10/1992 WIPO.
WO 96/16097 5/1996 WIPO.

*Primary Examiner*—John J. Gallagher
*Attorney, Agent, or Firm*—George P. Maskas; Kenneth P. Van Wyck

[57] ABSTRACT

Discloses compositions of urea dissolved in aqueous, polymerizable phenolic resole resins, wood-product laminated composite products produced with such resins, with or without the urea, and methods for the production of wood-product laminated composites with such resins. The resins contain the alkaline polymerization product of (a) formaldehyde polymerized with phenol and aliphatic hydrocarbylphenol or (b) aliphatic hydrocarbylphenol dissolved in the resin containing the polymerization product of phenol and formaldehyde, wherein the hydrocarbylphenol has from 9 to 17 carbon atoms in the hydrocarbyl group and the quantity of hydrocarbylphenol is from about 0.2% to 5% based on the weight of the aqueous resole resin. Wood-product laminate composites bound with the above resole resin, after curing, exhibit unexpectedly low water absorption, good internal bond strength and reduced thickness swell properties.

15 Claims, No Drawings

WOOD-PRODUCT LAMINATED COMPOSITES

This application is related to Provisional Application No. 60/038335 filed on Feb. 27, 1997 and 60/040,009 filed Mar. 3, 1997.

BACKGROUND OF THE INVENTION

This invention relates to phenolic resole resins which contain small quantities of aliphatic hydrocarbylphenol having from 9 to 17 carbon atoms in the hydrocarbyl group, their manufacture and use for making wood-product laminated composites and such composites manufactured from the resins. The resins will generally contain urea in a quantity sufficient to lower the viscosity of the resin and to scavenge formaldehyde. By the term "hydrocarbyl" we mean a monovalent group containing only the elements of hydrogen and carbon.

It has been found that from about 0.2 to about 5% of an aliphatic hydrocarbylphenol having from 9 to 17 carbon atoms in the hydrocarbyl group when polymerized with formaldehyde and phenol in an aqueous alkaline medium to form a phenolic resole resin or when post-added to an alkaline phenol-formaldehyde aqueous resin solution provides adhesives for the manufacture of wood-product laminated composites wherein the resulting composites have improved internal bond strengths, durability, decreased water absorption and thickness swell properties in comparison with phenolic resole resins which do not contain the specified hydrocarbylphenols in the indicated quantities of this invention.

Phenol-formaldehyde resole resins represent a large portion of the adhesive binders used in the manufacture of wood-product laminated composites. Phenol-formaldehyde resole resins are frequently used as laminate binders in the manufacture of wood-product laminated composites such as veneer products, e.g., plywood and LVL (laminated veneer lumber), as well as wood-particle composites, e.g., particleboard, waferboard, and OSB (oriented strand-board). In most cases, the laminated composites are in the form of panels.

Liquid phenolic resole resins bind as thermosets which are typically cured via hot pressing. Hot pressing is done under pressure with heat supplied via platens heated by hot oil, electricity, or steam. Phenolic thermoset curing methods include RF-curing (radio frequency) and steam injection pressing.

Traditionally, liquid phenol-formaldehyde resole resins constituted the predominant type of adhesive used as wood-product binders for products such as OSB and plywood. Recently, isocyanates such as PMDI (poly (methylenediphenyl-4,4'-diisocyanate)) have come into use as wood-product laminate composite adhesives for manufactured products. Isocyanates offer faster cure speeds, reduced tendency for water absorption, and lower overall manufacturing costs in comparison with phenolic resole resins. Also, less of the isocyanate is required.

A draw-back of wood product laminated composites bound with isocyanates is that they are prone to degradation because of lower rigidity and moisture induced internal panel stresses as well as health risks in the mill. This is particularly the case with non-veneer laminated composites. Isocyanates are especially prone to this form of degradation since they lack the durability of three-dimensional network crosslinking density inherent with phenol-formaldehyde resins. In order to further improve liquid phenolic resins and make them more competitive against isocyanates we began researching ways to improve such resins. We have found that the incorporation of certain small amounts of hydrocarbylphenol having from 9 to 17 carbon atoms in the hydrocarbyl group when polymerized with aldehyde and phenol in the manufacture of the resin polymer or when added to a preformed phenol-aldehyde resin which is eventually coated on wood products and bound under heat and pressure to form composite panels impart improved properties to the wood-product laminated composites.

The prior art shows the use of aldehydes reacted with various phenolics such as phenol, naphthol, and various hydrocarbylphenols and mixtures thereof for use in the manufacture of resole resins as well as the use of certain of the resole resins for the manufacture of composite panels and other materials. The prior art also shows the use of urea dissolved in certain resole resins for the manufacture of composite panels. However, the prior art does not show or suggest that the small quantities of the aliphatic hydrocarbylphenols used in this invention when polymerized with phenol and an aldehyde as part of the manufacture of a phenol-formaldehyde-hydrocarbylphenol resole resin or when such hydrocarbylphenols are simply dissolved in a preformed phenol-aldehyde resole resin provide superior and unexpected properties in the manufacture of composite panels, with or without urea.

BRIEF SUMMARY OF THE INVENTION

In one aspect, this invention relates to curable phenolic resole resins prepared by polymerizing phenol, aldehyde and aliphatic hydrocarbylphenol in an alkaline aqueous medium. The resin containing the polymerized phenol, aldehyde and aliphatic hydrocarbylphenol will further contain from about 0.2% to 18% by weight of urea dissolved therein, The quantity of polymerized hydrocarbylphenol is from 0.2% to 5% by weight of the aqueous resin wherein the hydrocarbylphenol has from 9 to 17 carbon atoms in the hydrocarbyl group.

In still another aspect of this invention, an aliphatic hydrocarbylphenol having 9 to 17 carbon atoms in the hydrocarbyl group is added to a curable aqueous, alkaline phenolic resole resin. The quantity of hydrocarbylphenol, based on the weight of the resin which includes hydrocarbylphenol will be from about 0.2% to 5%. Additionally the resin will include from about 0.2% to 18% by weight of urea dissolved therein either before or after the addition of the hydrocarbylphenol.

In yet another aspect of this invention, the above novel phenolic resins are used as binding adhesives, with or without dissolving urea in the resin, for the manufacture of wood-product laminated composites such as strand-board and plywood.

In a further aspect of the invention, wood-product laminated composites are prepared by coating wood components with the above curable phenolic resole resins, with or without urea dissolved therein, and then bonding the components under heat and pressure.

Other aspects of this invention are concerned with methods for manufacture of the phenolic resole resins of this invention as well as methods for the manufacture of wood-product composites such as strand-board and plywood bound with the novel phenolic resole resin.

DETAILED DESCRIPTION OF THE INVENTION

The Phenolic Components

The first phenolic component used in the synthesis of the phenolic resole resins of this invention is phenol. The second phenolic component is an aliphatic hydrocarbylphenol wherein the hydrocarbyl group has from 9 to 17 carbon atoms, preferably 10 to 17 carbon atoms and particularly 12 to 15 carbon atoms. The hydrocarbyl group can be branched chain, straight chain, or cycloaliphatic. The hydrocarbylphenols having 10 or more carbon atoms give substantially better results for use as bonding agent for wood product laminate composites as compared to nonylphenols. Hydrocarbylphenol reactants having a straight chain hydrocarbyl group such as alkyl or straight chain mono-, di-, or triethylenically unsaturated hydrocarbyl groups and mixtures thereof are preferred.

The hydrocarbyl group can be in the para-, ortho-, and preferably in the meta- position on the phenolic nucleus. The hydrocarbyl group can be a saturated hydrocarbyl group, i.e., alkyl or the hydrocarbyl group can be an olefinic mono- or poly-unsaturated hydrocarbyl group. Illustrative of the saturated aliphatic hydrocarbylphenols there can broadly be mentioned: nonylphenol, decylphenol, undecylphenol, dodecylphenol, tridecylphenol, tetradecylphenol, pentadecylphenol, hexadecylphenol and heptadecylphenol. Illustrative of specific hydrocarbylphenols there can be mentioned p-nonylphenol, o-decylphenol, m-undecylphenol, o-dodecylphenol, m-tridecylphenol, p-tetradecylphenol, m-pentadecylphenol, o-pentadecylphenol, p-pentadecylphenol, o-hexadecylphenol, and p-heptadecylphenol, mixtures of the foregoing and cashew nut shell liquid. Various ethylenic unsaturated hydrocarbyl groups can be attached to the phenol nucleus but preferably the unsaturated hydrocarbylphenols are that of cashew nut shell liquid (CNSL). CNSL is obtained by special heat treatment and decarboxylation of cashew nut shells. CNSL is a mixture of phenolic compounds with a major amount being straight chain monofunctional (monohydroxylic) meta substituted hydrocarbylphenols with the hydrocarbyl group having 15 carbon atoms with ethylenic unsaturation such as that of cardinol triene, cardinol diene, and cardinol monoene. CNSL also contains about 12% of difunctional (dihydroxylic) phenolic such as cardol diene, cardol triene, and cardol monoene. Smaller quantities of additional mono- or difunctional mononuclear phenols, mostly with a hydrocarbyl in the meta-position are also present.

The hydrocarbylphenols of this invention can be represented by the formula

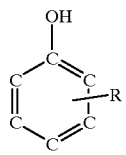

$(C_6H_4OHR)$ wherein R is hydrocarbyl of 9 to 17 carbon atoms, e.g., dodecyl, pentadecyl, and the like.

The quantity of the aliphatic hydrocarbylphenol used in the manufacture of the phenol-aldehyde-hydrocarbylphenol resole resin as well as for the addition of hydrocarbylphenol to a preformed phenol-aldehyde resole resin is about 0.2 to 5%, preferably 0.2 to 3% and particularly 0.4 to 2% based on the weight of the aqueous resin medium which includes the hydrocarbylphenol. Quantities of the hydrocarbylphenol of less than about 0.2% based on the weight of the aqueous medium have minimal to no effectiveness whereas quantities substantially greater than about 3% do not appear to impart significant additional desirable properties. Additionally, quantities of the hydrocarbylphenol greater than about 5% by weight of the aqueous resin medium are difficult to dissolve and can form suspensions, including gummy dispersions which are deleterious for use in the manufacture of wood product laminated composites. Additionally, when quantities of greater than about 5% are used for manufacture of the aldehyde-phenol-hydrocarbylphenol polymer or by simply adding such quantities to a preformed phenol-aldehyde resole resin and the resin is subsequently stored at low temperature, which is conventional with phenolic resole resins, there is a tendency for unstable suspensions and gummy deposits to be formed in the resin. Generally, smaller quantities of hydrocarbylphenol are required to obtain a product of improved properties as the number of carbons in the hydrocarbyl group increase from 9 to 17 carbon atoms.

Although post addition of hydrocarbylphenol to a preformed phenol-aldehyde resole resin provides panels with desirable properties, an advantage of polymerizing the hydrocarbylphenol initially with phenol and aldehyde is that post-addition of the free hydrocarbylphenol provides environmentally undesirable volatile organic components to the resin, particularly on curing, and furthermore the hydrocarbylphenols have topical toxicity and have recently been added to the list of potential endocrine disrupter suspects.

The 0.2 to 5% range of hydrocarbylphenol polymerized or dissolved as part of the resole resin converts to about 0.5% to 20% by weight of hydrocarbylphenol based on the total weight of polymerized phenol and hydrocarbylphenol or based on the total weight of polymerized phenol and dissolved hydrocarbylphenol in the resin, generally not more than 15% and preferably from about 1.2 to 8% by weight of hydrocarbylphenol based on both the phenol and hydrocarbylphenol. The amount of free phenol in the resin solution, e.g. when used as a binder, is generally less than 1% and preferably less than 0.5% by weight of the resin. The free aldehyde, e.g., formaldehyde, in the resin will typically be less than about 0.3% and preferably less than about 0.1% by weight of the resin.

The Aldehyde.

The aldehyde reacted with the phenolic components can include any of the aldehydes heretofore employed in the formation of phenolic resins such as formaldehyde, acetaldehyde, propionaldehyde, furaldehyde and benzaldehyde. In general, the aldehydes contemplated have the formula $R^1CHO$ wherein $R^1$ is hydrogen or a hydrocarbyl group of 1 to 8 carbon atoms. The preferred aldehyde is formaldehyde or wherein only a portion, such as less than 25%, of the formaldehyde is substituted with another aldehyde. Aldehyde donors such as formalin, para formaldehyde, alpha-polyoxymethylene, hexamethylenetetramine, etc. can also be used as the aldehyde.

The Resole Resin.

By the term "resole" we mean a polymer obtained by alkaline reaction of phenol and aldehyde wherein the mole ratio of phenolic component to aldehyde varies from about 1:1 to 1:3. The phenolic component in this mole ratio includes hydrocarbylphenol in addition to phenol.

The reaction in the manufacture of the phenolic resole resins of this invention with aldehyde and the two phenolic components takes place in an aqueous alkaline medium at elevated temperatures, e.g., 60° C. to 105° C. or even higher if the reaction vessel is pressurized. The alkalinity can be provided by the presence of alkaline materials such as sodium hydroxide, potassium hydroxide, ammonia, sodium sulfite and the like. When the hydrocarbylphenol is polymerized together with phenol and formaldehyde in making the resin, such process is referred to herein as having the hydrocarbylphenol cooked in the resin.

The resole resins of this invention are referred to as aqueous solutions since the solids are dissolved in water or water together with minor amounts, e.g., less than about 3% or 9% by weight of a non-reactive solvent. Some of the resins of this invention form clear solutions whereas others appear to have some turbidity.

A typical resin containing the phenol-aldehyde-hydrocarbylphenol polymer is made by charging a reactor with phenol, an aliphatic hydrocarbylphenol having from 9 to 17 carbon atoms in the hydrocarbyl group, water and caustic soda (50% NaOH) to form an aqueous alkaline solution of the phenol and hydrocarbylphenol, followed by the slow addition of formaldehyde. Additional caustic soda is generally added after the formaldehyde has reacted. The resulting reaction mixture is then heated under vacuum and condensed to the desired end-point. The extent of reaction (and subsequent molecular weight) is typically monitored by refractive index (RI) or by Gardner tube viscosity. When the desired extent of reaction is attained, the reaction mixture is cooled and generally urea is added and dissolved in the resin as a thinning agent and free formaldehyde scavenger.

A typical resin of this invention wherein the hydrocarbylphenol is post-added to a preformed phenol-aldehyde resin is simply prepared by dissolving the hydrocarbylphenol in an alkaline phenol-aldehyde resin. The phenol-aldehyde resin is prepared in a manner similar to that of the terpolymerized resin containing hydrocarbylphenol with the omission of the hydrocarbylphenol.

The resins of this invention have an alkalinity content, i.e., contain a base, in the range of 0.5% to about 15%, and preferably 1% to 12%, based on the weight of the resin solution, when the base is sodium hydroxide. Thus, the term "alkalinity content" or simply "alkalinity" is based on sodium hydroxide solids. When a different base is used, the alkalinity content is proportionally equivalent on a molar weight basis. For example, to attain a 4% sodium hydroxide equivalent weight alkalinity content, it requires 4 grams of sodium hydroxide in 100 grams of resin solution, but 5.61 grams of potassium hydroxide in 100 grams of the resin are required to attain the same alkalinity content. Additional base can be added to a resole resin after manufacture in order to bring it to the desired alkalinity content, target viscosity, or both. The pH of the resole resin will be at above 8, preferably above 9, and particularly above 10.

The resins of this invention will have a resin pan solids content of about 20% to 75% by weight and preferably about 45% to 60%. The water content of the resin at the time of manufacture of the resin will generally vary from about 80% to 25% and preferably from about 40% to 55% by weight of the entire aqueous alkaline resin. Generally, the viscosity should be such as to permit the solution to be sprayed on the cellulosic components such as flakes or strands or to otherwise be applied to the components such as veneer. Thus, the viscosity of the resin will generally vary from about 50 to about 1,000 centipoise at 25° C. as determined by a Brookfield RVF viscosimeter with a number 2 spindle at 20 revolutions per minute at 25° C. and preferably from about 100 to 300 cps at 25° C. when used with particulate components such as wood strands.

The number average molecular weight of the resins of this invention is preferably greater than about 700, more preferably greater than about 1,000, and most preferably within the range of about 1,000 to 2,200 for use with wood particle panels such as particleboard and OSB with a special preference for weights between about 1,000 and 1,888. The resins used with plywood should also have a number average molecular weight in excess of about 700, preferably weights between about 1350 and 3,000, most preferably between about 1,500 and 2,500.

Although liquid resins are preferred for use in the manufacture of the laminated composite products of this invention, the resins can be spray dried and used as powders by conventional techniques, e.g. see U.S. Pat. No. 5,047,275 of Sep. 10, 1991 to S. Chiu which is incorporated herein by reference in its entirety.

The resins of this invention may be used as is or may be extended by mixing the resin with extenders such as flour or other suitable fillers. The "as is" resins are typically used for composition panels while the extended resins are used for plywood.

Additives

Suitable additives can be used in the resin for coating the raw wood components. Thus, from 0.25 to 3% by weight, based on the weight of the oven dry wood of the board product, of molten slack wax as well as emulsified wax can be used. Still further, from 5% to 20% by weight, based on the weight of the oven dry wood in the board product, of a suitable plasticizer may be included. Suitable plasticizers include glycol esters, glycerine esters, phosphate esters and the like.

Thickeners such as the various gums, starches, protein materials and clays may be used together with the resins. The resins can have additives dissolved therein. Illustratively urea is often dissolved in the resin in order to decrease the resin viscosity. When urea is used, its quantity can vary over a broad range such as from about 0.2% to 18% based on the weight of the resin solution containing the urea, preferably from about 2% to 14% thereof and particularly from about 8 to 12% thereof. In addition to reducing viscosity, the urea also acts as a formaldehyde scavenger for the resin.

Anti-foam agents can also be helpful for use in the manufacture of the resins of this invention. Illustrative of such anti-foam agents there can be mentioned silicone anti-foam agent designated as Q2-3183A of Dow-Corning of Midland Mich.; and Colloid 581B and Colloid 999 which are products of Rhone-Poulanc having an office at Prospect Plains Road, Cranberry, N.J. 08512-7500. When anti-foam agents are used the quantity thereof will vary from about 0.001% to 0.3%, depending on the type of anti-foam agent used, preferably about 0.001 to 0.1% and particularly about 0.002 to 0.05% based on the weight of aqueous resin including the anti-foam agent. Smaller quantities of anti-foam agent are used with the more efficient anti-foam agents such as the silicones.

Apart from the small quantities of anti-foam agents, other emulsifiers are preferably avoided since they adversely affect the resin moisture responses and bonding properties. Thus, the compositions of this invention will preferably be substantially free of emulsifiers. By substantially free we mean the use of no more than about 1%, preferably no more than about 0.5% and particularly no more than about 0.2% based on the weight of the resin, including the emulsifier. Other components such as fillers and/or extenders may also be added to the resole resins of this invention.

The curing rate of the resin may be accelerated by contacting the resin or wood components with a curing agent. The curing agent may be a conventional curing accelerator such as a carboxylic acid ester, a lactone, an organic carbonate or a resorcinol-glutaraldehyde resin such as is disclosed in U.S. Pat. No. 5,498,647 of Mar. 12, 1996 to D. Shiau et al. The amount of curing agent can vary over a wide range such as that of about 1% to 20% of the resin solids.

Application of the Resinous Adhesive

As is conventional in the art, the adhesive, i.e. resin together with any additives is applied to wood product fibers, flakes, chips, strands and the like by various spraying techniques whereas it is generally applied to veneers by coaters. Resin applied to the wood components is referred to herein as a coating even though it may be in the form of small resin particles such as atomized particles which do not form a continuous coating.

The range of resin solids in the resole resin before curing which are applied to the wood components can vary from about 1% to 15% and preferably 2% to 8% by weight of the wood components on dry finished panel weight depending of the quality of the panel product desired.

Hot pressing conditions for the panels utilizing the resinous adhesive of this invention will depend on the thickness of the board, the type of board, as well as on the resin characteristics. Generally, the platen temperatures can vary from about 240° F. (115° C.) to 450° F. (232° C.) with applied pressures which can range up to about 1200 psi for about 2 to 10 minutes.

The Wood Components

The wood components which are the basic raw materials for the wood-product laminate composites which can be made with the adhesives of this invention may be derived from various species of wood in the form of wood fibers, chips, shavings, strands, flakes, particles and veneers. These materials which are used to prepare the laminated composites are referred to generally herein as wood components. The manufactured products include hardboard, particleboard, fiberboard, waferboard, strand-board and the like as well as plywood, and LVL. The internal bond strength of these products will be at least about 30 pounds per square inch (psi).

Methods for making plywood, cellulosic board, oriented strand-board (OSB) and the like are described in prior art as for instance in U.S. Pat. Nos. 4,758,478 to Daisy et al and 4,961,795 to Detlefsen et al., which patents are incorporated herein by reference in their entirety. For example, when producing a composition panel such as particle board or oriented strand-board by a mat process, wood flakes, strands or particles can be sprayed with a solution of the resin of this invention. The sprayed pieces of wood components may be passed through a forming head to make a mat. Hot pressing conditions for the mat will depend upon the target thickness for the board product as well as on the characteristic of the binder.

This invention is particularly useful in the manufacture of plywood and oriented strand-board. Plywood is composed of a multiple layer of wood veneers. The veneers are usually arranged so that the wood grain direction is perpendicular in adjacent veneers.

The plywood process requires straight logs cut to length, and conditioned in heated vats containing water and surfactants to increase the heating efficiency of the vats. The heated logs are then "peeled" wherein a veneer of predetermined thickness is removed continuously until the log diameter is reduced to a certain point, usually 5–8 inches (12.7–20.3 cm.) The veneer is than clipped into strips, sorted and dried to a moisture content of 15% or less.

After drying, the veneers are graded and assembled into plywood panels. The adhesive is applied to the veneers at this stage of manufacture. The adhesive is usually composed of the liquid resin and fillers that include inorganic and organic flours, such as wheat flours, wood flours, and clays. The adhesives are specially formulated for individual user mills depending on manufacturing equipment, type of wood to be glued, type of product to be made, and ambient environment conditions at the time of panel manufacture. The adhesive is usually applied to the veneers by roll coater, curtain coater, sprayline or foam extruder. The adhesive usually contains the resin at a level of 20% to 40% resin solids by weight. The adhesive is normally used with spread levels of 50 pounds to 55 pounds (27.2–25 Kg) when spread on one side.

After the adhesive is applied to the wood veneers and the panels are assembled, they are consolidated under heat and pressure. This is usually done in a steam hot press using platen temperatures of about 240–350° F. (115–176.5° C.) and pressures of 74–250 pound per square inch (5.2–17.6 Kg/sq cm)

Oriented strand-board or OSB is manufactured by orienting wood strands to increase strength and stability whereas waferboard consists of flakes randomly oriented and pressed into panels. Oriented strand-board uses wood strands longer than they are wide, which makes it possible to orient them in a specific direction. Placement and orientation is accomplished mechanically, generally through the use of a forming machine. Typically, OSB panels have 3 or 5 layers. To optimize panel stiffness, top and bottom layers of the panels have strands oriented length-wise. Strands in the core layer are oriented randomly or in some cases perpendicular to the face orientation. This orientation strategy increases panel stiffness, strength, and dimensional stability. Typical OSB process stages are as follows: (a) logs are delivered; (b) logs are stored in woodyard; (c) logs are soaked in heated vats; (c) logs are debarked; (d) logs are flaked into strands and dried to a moisture content of about 1 to 15%; (e) screens are used to remove fines; (f) strands are blended with resin and wax with the quantity of resin typically being about 2 to 5.5% and the quantity of wax being from about 0.5 to 2%, both based on the weight of the dried strands; (g) blended strands are dropped into a formline to orient the strands and form mats; (h) mats are pressed, typically for about 4 to 7 minutes at a temperature of about 240 to 450° F. (115–232° C.) into $^{23}/_{32}$ inch thickness panels; (i) panels are cut to desired dimensions, stacked into units and then loaded onto trucks and shipped.

The most common thicknesses for the OSB panels vary from about $^{7}/_{16}$ of an inch to $^{23}/_{32}$ of an inch (1.1–1.8 cm). The dimensions of the strands used in making oriented strand-board typically vary from between a length of about 2.5 to 6 inches (0.4 to 15 cm), a thickness of about 0.025 to 0.15 inches (0.063–0.38 cm) and widths of about 1 to 4 inches (2.54–10.2 cm). However, the strand dimensions can vary depending on the contemplated end use of the product. Thus, for some applications strands are as much as 12 inches (30.5 cm) long.

The invention will be demonstrated by the following examples. In these examples and elsewhere through the specification, parts and percentages are by weight unless expressly indicated otherwise. Unless indicated otherwise, the quantity of the aliphatic hydrocarbylphenol is expressed as a percentage based on the weight of the aqueous, alkaline phenolic resole resin. The aqueous alkaline phenolic resole resin, also simply referred to as the resin or resin solution, includes all of the ingredients in the resin such as water, any free phenol or formaldehyde, polymerized phenol-formaldehyde, alkalizing agent and the hydrocarbylphenol, the phenol-formaldehyde-hydrocarbylphenol and urea when urea is part of the resin. Also, the term "resin solids" refers to pan solids according to an industry accepted test where one gram of resin is placed in an aluminum pan and heated in a forced air oven at 125° C. for one hour and 45 minutes.

A large number of variables are involved in the testing of laminate composites for bond strength and effects of moisture so that direct comparisons are difficult to make from example to example. Nevertheless, comparisons can be made within any single example and also the relation of test results of the control sample, i.e. resin without polymerized or dissolved hydrocarbylphenol, in comparison to test results for other samples in various examples can be validly compared. Illustrative of variables are: the furnish can be from different sources but even if from the same source, the furnish can differ due to the mix of different wood species and wood density; constituents in the wood can differ, e.g. a tree grown on the shady side of a hill will have different percentages of various constituents as compared to a tree grown on the sunny side of the hill; the relative humidity may vary from time to time; and the use of different operators at different stages of the preparation of samples for testing, particularly in the felting operation can produce somewhat different results because of varying board density, among other factors.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practices within the art to which the invention pertains.

EXAMPLE 1

Typical Preparation of the Phenolic Resole Resin of Phenol and Hydrocarbylphenol Polymerized with Formaldehyde Charge a five liter 3-neck round bottom flask (kettle) with 1185.2 parts of phenol, 21.8 parts of 4-dodecylphenol, 50.8 parts of sodium hydroxide, and 462.5 parts of water. Then begin heating the kettle. When the temperature reaches about 60° C. begin slowly charging 492 parts of formaldehyde in an aqueous solution into the reaction mixture. The formaldehyde solution is preheated to about 50° C. before being charged into the reaction mixture. The formaldehyde is charged slowly over the course of thirty minutes while maintaining the temperature at 98° C. After all of the formaldehyde has been added, maintain the temperature at about 98° C. such as by ref lux reaching an equilibrium between heat and vacuum for ninety minutes. The reaction mixture is then cooled to about 94° C. and begin charging 985.8 parts of additional formaldehyde slowly over the course of thirty minutes while maintaining the temperature at 94° C. Cool the reaction mixture to 92° C. such as by using vacuum, cold water or removal of the heat source and monitor the reaction progress. Condense the mixture to Gardner-Holt D-E viscosity. Cool the reaction mixture to 80° C. and condense to Gardner-Holt T-U viscosity. Cool the reaction mixture to 75° C. and condense to Gardner-Holt W-X viscosity. Cool the reaction mixture to 72° C. and charge an additional 238.5 parts of sodium hydroxide. At 72° C. condense the reaction mixture to Gardner-Holt X-Y viscosity. Begin "full cool" of the reaction mixture such as by using a water shower over the reaction flask. When the reaction mixture cools to 40° C. or below, add 198.9 parts of sodium hydroxide. At or below 30° C. add 363.7 parts of urea. All parts herein are by weight. The calculated theoretical value of this resin is that of: a total of 4,000 parts; F/P ratio of 2.47 to 1; solids of 49.67%; alkalinity of 6.10; with 0.6% of 4-dodecylphenol polymerized together with phenol and formaldehyde in the resin.

A typical terpolymerized resin of this invention containing 0.6% of 4-dodecylphenol will have an alkalinity of 6.31%; free formaldehyde of 0.08%; fresh viscosity of 280 cps at 25° C.; surface tension of 32.1 dynes/cm at 25° C.; a boiling water gel of 19 minutes and 18 seconds; a refractory index of 1.4816 at 25° C. and a number average molecular weight of 1333.

EXAMPLE 2

The test results for resin performance in the manufacture of the laminated composite panels of this invention is obtained by the manufacture of 15 inch(38 cm) by 15 inch (38 cm) OSB test panels, preferably of three quarters of an inch (1.9 cm) thickness. These panels are made using a Washington Ironworks hot oil press. The furnish, (wood strands for strand-board) is first conditioned to a pre-selected moisture content of 3 to 4%. Next, the resins are sprayed onto the furnish, following an initial treatment with wax. The resin-coated strands are then oriented into a mat, placed between 2 caul-plates and hot-pressed with platens heated at about 400° F. (204° C.) After the boards are made, they are allowed to cool for a time, and then are cut-up and tested using ASTM standard test method D1037 except that the method was modified to the extent of using samples having dimensions of 5 inches (12.7 cm) by 5 inches (12.7 cm) instead of 6 inches (15.2 cm) by 6 inches (15.2 cm). Some erratic results can be obtained in these tests due to the relatively small panels, i.e., the 15 inch (38 cm) by 15 inch (38 cm) panels which are then cut into the smaller samples and furthermore the preparation of these panels involves many physical and some chemical steps.

In the following Tables 2A, 2B, 2C, 2D, and 2E, the following abbreviations have the following meanings:

"IB" is internal bond strength expressed as pounds per square inch and also converted to kilograms per square centimeter.

"WA" is water absorption as percent change from the samples original weight.

"TS" is thickness swell as percent change from the samples original thickness.

"CON" is a phenol-formaldehyde resole resin suitable for binding laminated composites having a formaldehyde to phenol molar ratio of 2.4 and having 9.1% of urea dissolved therein. Various resins were compared with CON resin by reacting a mixture of hydrocarbylphenol and phenol with formaldehyde in the same manner as with the preparation of the CON (Control) resin which did not contain hydrocarbylphenol. The hydrocarbylphenol, in the amounts indicated in the Table, replaced a portion, by weight, of the phenol used in the preparation of the CON phenol-formaldehyde resin. Phenol, similar to that used to obtain the results in these tables was analyzed for any long chain or short chain hydrocarbylphenol impurity. A maximum impurity in the phenol of 0.15% was found and such impurity was predominantly that of o-cresol. Therefore, hydrocarbylphenols other than O-cresol are not present in any significant level.

"A-DDP" is a resin having substantially the same composition and method of manufacture as resin CON except that a portion of the phenol used in its manufacture, as indicated in the table entries, has been replaced with 4-dodecylphenol of the Aldrich Chemical Company.

"A-PDP" is a resin having substantially the same composition and method of manufacture as resin CON except that a portion of the phenol used in its preparation has been replaced with 3-pentadecylphenol of Aldrich Chemical Company in the amount indicated in the table.

"S-OCT" is a resin having substantially the same composition and method of manufacture as resin CON except that a portion of the phenol used in its preparation has been replaced with 4-octadecylphenol of Schenectady International in the amount indicated in the table.

"V-DDP" is a resin having substantially the same composition and method of manufacture as resin CON except that a portion of the phenol used in its preparation has been replaced with 4-dodecylphenol, in the concentration shown in the tables, and wherein the dodecylphenol is a product of the Vilax Chemical Company.

"CARD" is a resin having substantially the same composition and method of manufacture as resin CON except that a portion of the phenol used in its preparation has been replaced with cashew nut shell liquid of the Cardolite Company, namely, Cardolite NC-700.

The laminated composites tested in this example are those of OSB (oriented strand-board)

In the following tables, under the designation of "%*" is the percent by weight of the aliphatic hydrocarbylphenol which was substituted for phenol in the terpolymerization of the resin, based on the weight of the aqueous resin composition during the manufacture of the resin. The "WA % IMP" and "TS % IMP" is the percent of improvement in water absorption or thickness swell, respectively, of the indicated sample in relation to the CON resin which did not contain hydrocarbylphenol polymerized therein.

TABLE 2A

| Resin | %* | IB, lb/in$^2$ | IB, Kg/cm$^2$ | WA % | WA % IMP | TS % | TS % IMP |
|---|---|---|---|---|---|---|---|
| CON | 0 | 41.0 | 2.88 | 76.0 | | 31.5 | |
| A-DDP | 0.5 | 46.4 | 3.26 | 76.4 | -0.5 | 27.9 | 11.4 |
| A-DDP | 1.0 | 33.5 | 2.36 | 80.9 | -6.1 | 32.8 | -4.0 |
| A-DDP | 2.0 | 36.4 | 2.56 | 64.3 | 15.4 | 26.2 | 16.8 |
| A-PDP | 0.5 | 45.1 | 3.17 | 60.1 | 20.9 | 20.0 | 36.5 |

It can be seen from Table 2A above that at the test concentrations, the hydrocarbylphenols offer improvement in properties in comparison with the Control (CON)resin when used as binders in the preparation of oriented strand-board.

TABLE 2B

| RESIN | %* | IB, lb/in$^2$ | IB, Kg/cm$^2$ | WA % | WA % IMP | TS % IMP | TS % |
|---|---|---|---|---|---|---|---|
| CON | 0 | 35.3 | 2.48 | 77.8 | | | 30.7 |
| S-OCT | 1.0 | 26.0 | 1.83 | 81.2 | -4.2 | 1.0 | 30.4 |
| A-DDP | 0.5 | 38.5 | 2.71 | 61.5 | 21.0 | 27.0 | 22.4 |
| A-DDP | 1.0 | 38.0 | 2.67 | 66.3 | 14.8 | 28.7 | 21.9 |
| A-PDP | 1.0 | 44.3 | 3.11 | 50.5 | 35.1 | 46.6 | 16.4 |

From the above Table 2B it can be seen that the S-OCT resin with its 18 carbon hydrocarbyl group was not as effective as the hydrocarbyl phenols having from 12 or 15 carbon atoms.

TABLE 2C

| RESIN | %* | IB, lb/in$^2$ | IB, Kg/cm$^2$ | WA % | WA % IMP | TS % IMP | TS % |
|---|---|---|---|---|---|---|---|
| CON | 0 | 29.1 | 2.04 | 74.3 | | | 29.4 |
| A-DDP | 0.5 | 26.0 | 1.83 | 54.4 | 26.8 | 35.0 | 19.1 |
| A-DDP | 1.0 | 41.5 | 2.92 | 56.3 | 24.2 | 20.4 | 23.4 |
| V-DDP | 0.5 | 32.6 | 2.29 | 50.8 | 31.6 | 43.2 | 16.7 |
| V-DDP | 1.0 | 31.2 | 2.19 | 40.9 | 45.0 | 59.9 | 11.8 |

From the above Table 2C and the following Tables 2D and 2E, it can be seen that the hydrocarbylphenols in the concentrations employed offer improved properties when used as binders in the preparation of OSB panels when compared with the Control (CON) resin which did not contain hydrocarbylphenol.

TABLE 2D

| RESIN | %* | IB, lb/in$^2$ | IB, Kg/cm$^2$ | WA % | WA % IMP | TS % IMP | TS % |
|---|---|---|---|---|---|---|---|
| CON | 0 | 49.3 | 3.46 | 59.1 | | | 20.6 |
| V-DDP | 0.5 | 34.1 | 2.40 | 53.2 | 10.0 | 0 | 20.6 |
| V-DDP | 1.0 | 35.3 | 2.48 | 54.8 | 7.3 | 14.1 | 17.7 |
| CARD | 0.5 | 38.4 | 2.70 | 58.7 | 0.7 | 9.7 | 18.6 |
| CARD | 1.0 | 37.7 | 2.65 | 42.8 | 27.6 | 37.4 | 12.9 |

TABLE 2E

| Resin | %* | IB, lb/in$^2$ | IB, Kg/cm$^2$ | WA % | WA % IMP | TS % IMP | TS % |
|---|---|---|---|---|---|---|---|
| CON | 0 | 46.5 | 3.27 | 71.3 | | | 26.7 |
| A-DDP | 0.5 | 46.5 | 3.27 | 59.2 | 17.0 | 31.1 | 18.4 |
| A-DDP | 1.0 | 45.5 | 3.20 | 60.5 | 15.1 | 30.7 | 18.5 |
| A-DDP | 3.0 | 40.7 | 2.86 | 73.3 | -2.7 | -0.7 | 26.9 |
| A-DDP | 5.0 | 44.3 | 3.11 | 45.6 | 36.0 | 4.5 | 25.5 |

EXAMPLE 3

Phenol-formaldehyde resole resin IN703A, a product of Borden Chemical, Inc., of 180 East Broad Street, Columbus, Ohio 43215, was compared with a resin made the same way as IN703A and having the same composition except that 1% of phenol starting material was substituted with 1% of Cardolite NC-700 in the polymerization with formaldehyde. Resin IN703A has a formaldehyde to phenol mole ratio of 2.2. The resin containing the Cardolite was designated IN703B. Both the standard resin (IN703A), also referred to as CONTROL RESIN and resin IN703B, also referred to as the TEST RESIN included 14.7% of urea dissolved in the resin. Resin IN703A is a conventional oriented strand-board resin having a solids content of 53%. Some foaming was experienced during the manufacture of the TEST RESIN and about 0.2% of Colloid 999 was used to control the foaming. Colloid 999 is a product of Rhone-Poulanc having an office at Prospect Plains Road, Cranberry, N.J. 08512-7500.

Each of the IN703A and IN703B resins were used to make oriented strand-boards of ⅜ (0.95 cm), ⁷⁄₁₆ (1.1 cm), and ²³⁄₃₂ (1.8 cm) thickness by the same conventional techniques. The tests were run in substantially the same way as in Example 2. The results, as averages, for change in edge swell and change in center thickness, expressed as percent, due to moisture are shown in Table 3 below. Table 3 below also shows the density of the sample and this is expressed as pounds per cubic foot (lb/ft$^3$) and it is further converted to kilograms per cubic meter (Kg/m$^3$)

It can be seen from Table 3 below that a 34% improvement in edge swell and a 25% improvement in center thickness was obtained in comparison with the standard test resin by use of IN703B which contained the terpolymerized Cardolite NC-700.

TABLE 3

| Product | Density (lbs/ft³) | Density (Kg/M³) | Edge Swell | Center Thickness |
|---|---|---|---|---|
| TEST RESIN | 43.1 | 690 | 12.4% | 11.3% |
| CONTROL RESIN | 43.6 | 698 | 18.9% | 15.1% |

EXAMPLE 4

This example shows tests on OSB samples wherein Control (CON) resin Borden 303K, a phenol-formaldehyde resole resin having a formaldehyde to phenol mole ratio of 2.4 and including 9.5% of urea was used as the core resin and Borden IN703A phenol-formaldehyde resin was used as the face-resin for oriented strand-board samples, designated "B" in Table 4 in comparison with samples treated in the same manner wherein by use of the face-resin and the same core resin but: sample 303K resin was modified by having 0.5% of 4-dodecylphenol substituted for an equal weight to phenol and cooked in the resin, i.e. terpolymerized with the phenol and formaldehyde, this is designated as "A" in Table 4; 0.5% of linseed oil was back-added to the 303K resin and this is designated as "C" in Table 4; and 0.5% of 4-dodecylphenol was back-added to the 303K resin and this is designated as D in Table 4. The IN703A resin used as a face-resin was not modified by cooking in or back-adding any of the modifiers of the 303K resin. The 303K resin contained 9.5% of urea in all instances whereas resin IN703A contained 14.7% of urea, by weight of the resin. The procedure set forth in Example 2 was used for testing the resins in this example.

The control parameters for this example included: 3.5% resin treatment on the wood particles; a 3.5 minute press cycle for 2 and 7/16 inch (6.2 cm) boards; 1% wax treatment; a 3% moisture content for the wood flake starting material; and pressing at 400° F. (204° C.).

The tests were run in duplicate. Results, as averages of the duplicate runs are shown in Table 4.

It can be seen from Table 4 below that the 0.5% addition of 4-dodecylphenol, post-added, to the standard resin (Control) as well as the use of 0.5% of dodecylphenol substituted for an equal amount of phenol and polymerized in with the phenol and formaldehyde showed good improvement in internal bond (IB) strength over the Control. The percent water absorption (WA) and thickness swell (TS) values showed little difference between the Control and the resins which included the hydrocarbylphenol and this is believed to be due to the lack of hydrocarbylphenol in the face-resin. The Table also shows the percent improvement in the water absorption (WA % IMP.) and percent improvement in thickness swell (TS % IMP.) in relation to the Control. The use of linseed oil back added to the 303K resin resulted in internal bond strengths comparable to the resins using the hydrocarbylphenol however, the water soaks suffered greatly.

TABLE 4

| Sample | IB, lb/in² | IB, Kg/cm² | Density lb/ft³ | Density Kg/m³ | % WA | WA % IMP. | TS % IMP. | % TS |
|---|---|---|---|---|---|---|---|---|
| A | 83.5 | 5.87 | 43.1 | 690 | 38.4 | 4.5 | 11.1 | 25.7 |
| CON | 67.4 | 4.74 | 42.8 | 680 | 40.2 | | | 28.9 |
| C | 78.9 | 5.55 | 44.7 | 716 | 64.5 | −62.9 | −52.6 | 44.1 |
| D | 79.8 | 5.61 | 43.3 | 694 | 36.4 | 9.5 | 0.0 | 28.9 |

EXAMPLE 5

Samples of OSB panels made from phenol-formaldehyde resole resin FC-23B (Control), a product of Borden Chemical, Inc., was compared with panels wherein 1%, 3%, 5% and 7% of nonylphenol was substituted for an equal amount of phenol in polymerization of phenol and nonylphenol with formaldehyde during the manufacture of the resins. Resin FC-23B has a formaldehyde to phenol mole ratio of 2.4, 9.1% urea dissolved therein and 51% total solids. The resins were manufactured in the manner of Example 1 except that the FC-23B, the Control, did not contain nonylphenol and the other resins contained the below designated quantities of the nonylphenol. The samples were tested in accordance with the method of Example 2. The results of the tests are shown, as averages of 4 tests for the Control and each level of concentration of nonylphenol as shown in Table 5. Table 5 shows the percent water absorption and percent thickness swell of each sample, as well as the percent improvement(IMP) of water absorption (WA) and thickness swell (TS) of samples containing the nonylphenol in comparison to the Control which did not contain nonylphenol. It can be seen from Table 5 that the only samples which outperformed the Control were those wherein the resin had 3% of nonylphenol cooked therein. It can also be seen that the samples containing more than 3% of the nonylphenol and the sample containing 1% of the hydrocarbylphenol were less effective than the Control.

TABLE 5

| Resin | % Water Absorption | % IMP in WA | % Thickness Swell | % IMP in TS |
|---|---|---|---|---|
| Control | 43.2 | | 13.9 | |
| 1% Nonylphenol | 42 | 2.8 | 19.3 | −28.0 |
| 3% Nonylphenol | 34.6 | 19.9 | 10.9 | 21.6 |
| 5% Nonylphenol | 48.9 | −11.7 | 18.2 | −23.6 |
| 7% Nonylphenol | 45.4 | −4.8 | 16.9 | −17.8 |

EXAMPLE 6

Using the resins in Example 5, OSB panels were prepared and tests made to determine the Modulus of Rupture (M.O.R.). The test procedure for measurements of (M.O.R) is set forth in U.S. Pat. No. 5,498,647 to D. Shiau et al of Mar. 12, 1996 which is incorporated herein by reference in its entirety. The results of the tests wherein four samples of OSB were tested for each of the resins, except as otherwise indicated, are shown in Table 6. Table 6 also shows the percent improvement (IMP) in M.O.R. in relation to the Control. It can be seen from Table 6 that the only modified resin which produced better results than the control was the resin containing 3% of nonylphenol. The M.O.R. is expressed in pounds per square inch which has been converted to kilograms per square centimeter.

TABLE 6

| Resin | M.O.R., Kg/cm$^2$ | M.O.R. lb/in$^2$ | % IMP in M.O.R. |
|---|---|---|---|
| Control | 212.4 | 3022 | |
| 1% of nonylphenol | 187.8 | 2672 | −11.6 |
| 3% of nonylphenol | 229.5 | 3265* | 7.4 |
| 5% of nonylphenol | 172.0 | 2447 | −19.0 |
| 7% of Nonylphenol | 210.5 | 2994* | −0.9 |

*Only three tests were considered since one of the tests for each resin showed results which were not consistent with the other three.

EXAMPLE 7

In this example, FC-23B base resin was again used as the control resin and it was modified by replacing phenol for the designated quantity of hydrocarbylphenol or mixtures of hydrocarbylphenols in the polymerization of the resin in substantially the same manner as in Example 1 above. In the below Table 7, and Table 7A the abbreviations for the various samples designate the following resins: "CONTROL" is Resin FC-23B; whereas the remaining resin designations are the same as in Example 2 above.

In this example OSB samples of the Control resin were compared with OSB samples of various modified resins in determination of: M.O.R. in Table 7, expressed as pounds per square inch which were also converted to kilograms per square centimeter and the percent improvement in M.O.R. in relation to the Control; and in Table 7A, water absorption (%) and thickness swell (%) as well as the percent improvement in thickness swell (TS) and the percent improvement in water absorption (WA) in relation to the Control. The tests were run in substantially the same manner as in Example 2.

It can be seen that in all instances the samples of OSB using the modified resins outperformed the CONTROL and some of the modified resin mixtures gave better results than each of the modified resins alone. The data shown below are averages of 4 separate trials.

TABLE 7

| Resin | M.O.R. lb/in$^2$ | M.O.R. Kg/cm$^2$ | % IMP in M.O.R |
|---|---|---|---|
| CONTROL | 3456.8 | 243 | |
| 1% CARD | 4137.5 | 291 | 16.5 |
| 1% VDDP | 3511 | 247 | 1.5 |
| 0.5% VDDP + 0.5% CARD | 4243.2 | 298 | 18.5 |
| 0.99% VDDP + 0.99% CARD | 4393.5 | 308.9 | 21.3 |
| 1:1 Mixture of 1% ADDP + 1% CARD | 3925.5 | 276 | 11.9 |

TABLE 7A

| Resin | % Water Absorption | % IMP in WA | Thickness Swell % | % IMP in TS |
|---|---|---|---|---|
| CONTROL | 44.7 | | 14.8 | |
| 1% CARD | 29.4 | 34.2 | 7 | 52.7 |
| 1% VDDP | 31.3 | 30.0 | 6.4 | 56.8 |
| 0.5% VDDP + 0.5% CARD | 28.5 | 36.2 | 6.2 | 58.1 |
| 0.99% VDDP + 0.99% CARD | 26.4 | 40.9 | 5.8 | 60.8 |

TABLE 7A-continued

| Resin | % Water Absorption | % IMP in WA | Thickness Swell % | % IMP in TS |
|---|---|---|---|---|
| 1:1 Mixture of 1% ADDP + 1% CARD | 25.4 | 43.2 | 5.3 | 64.2 |

EXAMPLE 8

In this example, FC-23B base resin was again used as the Control resin. The Control resin was also modified by replacing 1% by weight of phenol for the designated hydrocarbylphenol set forth in Table 8 in the terpolymerization of the indicated resins wherein the procedure for preparation of the resins was by substantially the same manner as the preparation of the Control resin.

In Table 8 below, the various resins are abbreviated as follows: Resin FC-23B is referred to as "Control"; Cardolite NC-700 is referred to as "Cardolite"; 4-nonylphenol is referred to as "Nonyl" 4-tert-octylphenol is referred to as "octyl"; and 4-sec-butylphenol is referred to as "butyl". In addition to the indicated resin samples, samples were also prepared by substituting 1% of 4-dodecylphenol in place of phenol in the manufacture of the terpolymer in the same manner as the other terpolymer resins. However, errors occurred in the preparation of the dodecylphenol samples and the results were inconsistent with 4-dodecylphenol samples run in the past and therefor not included in Table 8.

The samples were tested for modulus of rupture (M.O.R.) and the results are reported in Table 8 as pounds per square inch and also converted to kilograms per square centimeter. Also, the samples were tested for percent water absorption and percent thickness swell due to water exposure in comparison with the samples weight or thickness, respectively before being subjected to the tests.

TABLE 8

| Resin | M.O.R. lb/in$^2$ | M.O.R. Kg/cm$^2$ | Water Absorption | Thickness Swell |
|---|---|---|---|---|
| Control | 3443 | 242 | 36.9% | 12.4% |
| 1% Cardolite | 3952 | 278 | 30% | 7.9% |
| 1% Nonyl | 3301 | 232 | 34.1% | 9.3% |
| 1% Octyl | 3330 | 234 | 34.1 | 9.8% |
| 1% Butyl | 3158 | 222 | 38.2 | 12.1 |

It can be seen from the above Table 8 that:

(a) the M.O.R. results for the resin containing terpolymerized Cardolite were 16% better than that of the resin containing terpolymerized octylphenol or nonylphenol and 20% better than that containing terpolymerized butylphenol;

(b) the water absorption results for the resin containing terpolymerized Cardolite were 12% better than the resin containing terpolymerized nonylphenol or octylphenol and 21% better than the resin containing terpolymerized butylphenol; and (c) the thickness swell results for the resin containing terpolymerized Cardolite were 19% better than the resin containing terpolymerized octylphenol, 15% better than the resin containing terpolymerized nonylphenol, and 34% better than the resin containing the terpolymerized butylphenol.

What we claim is:

1. A curable phenolic resole resin composition, said composition comprising urea and an aqueous solution of
a phenol-aldehyde resole resin and hydrocarbylphenol post-added and dissolved therein; wherein
(a) the hydrocarbylphenol has from 12 to 15 carbon atoms in the hydrocarbyl group and the quantity of the hydrocarbylphenol is from about 0.2% to 5% based on the weight of the phenolic resole resin composition; and
(b) from about 0.2% to 18% of urea, by weight, is dissolved in the composition.

2. The composition of claim 1 wherein the aldehyde is formaldehyde and the mole ratio of formaldehyde to phenol is from about 1:1 to 3:1.

3. The composition of claim 2 wherein the quantity of the hydrocarbylphenol is from about 0.2% to 3%.

4. The resin composition of claim 1 wherein the hydrocarbyl group is alkyl, or ethylenically unsaturated hydrocarbyl.

5. The composition of claim 3 wherein the quantity of hydrocarbylphenol is from about 0.4% to 2%.

6. The composition of claim 5 wherein the hydrocarbylphenol is a member selected from the group consisting of dodecylphenol, pentadecylphenol and cashew nut shell liquid.

7. A curable aqueous resin solution comprising:
(a) a phenolic resole resin comprising the alkaline polymerization product of phenol and formaldehyde with post-added and dissolved hydrocarbylphenol in the solution, said hydrocarbylphenol having 12 to 15 carbon atoms in the hydrocarbyl group, and wherein the quantity of hydrocarbylphenol is from about 0.5% to 20% based on the weight of phenol and hydrocarbylphenol; and
(b) from about 0.2% to 18% of urea based on the weight of the resin solution.

8. The composition of claim 7 wherein the hydrocarbylphenol is a mixture of hydrocarbylphenols.

9. A method for production of a wood-product laminated composite by bonding under heat and pressure which comprises: coating wood components with an aqueous solution of a curable phenolic resole resin composition wherein the range of resin solids before curing applied to the wood is from about 1% to 15% by weight of the wood on dry finished panel weight, said composition comprising a member selected from the group consisting of:
(A) a resole resin of a terpolymerized aldehyde, phenol and hydrocarbylphenol; and
(B) a phenol-aldehyde resole resin and hydrocarbylphenol post-added and dissolved therein; and wherein the hydrocarbylphenol has from 12 to 15 carbon atoms in the hydrocarbyl groups and the quantity of the hydrocarbylphenol is from about 0.2% to 5% based on the weight of the phenolic resole resin composition.

10. The method of claim 9 wherein the aldehyde is formaldehyde, the molar ratio of formaldehyde to phenol and hydrocarbylphenol in each of group (A) and (B) is from about 1:1 to 3:1 and the hydrocarbyl group is alkyl or straight chain ethylenically unsaturated hydrocarbyl.

11. The method of claim 10 wherein the hydrocarbylphenol is polymerized together with the phenol and formaldehyde.

12. The method of claim 10 wherein the hydrocarbylphenol is dissolved in the phenol-formaldehyde resole resin.

13. The method of claim 10 wherein the hydrocarbylphenol is that of cashew nut shell liquid.

14. A method for the production of plywood by bonding together with an adhesive binder that is curable under heat and pressure at least two plies having a layer of the adhesive between them comprising:
(A) applying to at least one surface of at least one ply an adhesive binder that is curable upon the application of heat and which comprises an aqueous alkaline phenolic resole resin solution;
(B) juxtaposing the ply to which the adhesive has been applied with another ply in contact with the adhesive; and
(C) then subjecting the said juxtaposed plies to heat and pressure to cure the binder and unite the plies to form plywood; wherein,
the phenolic resole resin solution comprises
(a) a phenolic resole resin solution prepared by reacting formaldehyde with a mixture of phenol and aliphatic hydrocarbylphenol having from 12 to 15 carbon atoms in the hydrocarbyl group; or
(b) a phenolic resole resin solution prepared by reacting formaldehyde with phenol and wherein a hydrocarbylphenol having 12 to 15 carbon atoms is post-added and dissolved in the solution; and
(c) the quantity of the hydrocarbylphenol in each of (a) and (b) is from 0.2% to 3% based on the weight of the solution.

15. A method for the production of oriented strand-board by bonding oriented wood strands under heat and pressure using an adhesive binder, which comprises:
(A) spraying strands of wood with a curable aqueous phenolic resole resin solution;
(B) forming the sprayed strands into an oriented mat;
(C) subjecting said mat to heat and pressure to cure the resin and to unite said oriented strands to form board, wherein the adhesive comprises a phenolic resole resin solution selected from the group consisting of:
(1) a resole resin of terpolymerized formaldehyde, phenol and hydrocarbylphenol; and
(2) a phenol-formaldehyde resole resin and hydrocarbylphenol post-added and dissolved in the solution and the hydrocarbyl group in each of group (1) and (2) has from 12 to 15 carbon atoms, wherein,
(a) the quantity of the hydrocarbylphenol in each of group (1) and (2) is from 0.2% to 3% by weight of the solution; and
(b) the resin solution contains from about 2% to 14% of urea.

* * * * *